United States Patent [19]

Yamahata

[11] Patent Number: 4,992,969

[45] Date of Patent: Feb. 12, 1991

[54] INTEGER DIVISION CIRCUIT PROVIDED WITH A OVERFLOW DETECTOR CIRCUIT

[75] Inventor: Hitoshi Yamahata, Tokyo, Japan

[73] Assignee: NEC Corporation, Tokyo, Japan

[21] Appl. No.: 381,077

[22] Filed: Jul. 18, 1989

[30] Foreign Application Priority Data

Jul. 19, 1988 [JP] Japan .................................. 63-181018

[51] Int. Cl.⁵ .............................................. G06F 7/52
[52] U.S. Cl. ..................................................... 364/761
[58] Field of Search ................. 364/761, 764, 766, 767

[56] References Cited

U.S. PATENT DOCUMENTS

| | | | |
|---|---|---|---|
| 3,621,218 | 11/1971 | Nishimoto | 364/766 |
| 3,852,581 | 12/1974 | Reynard et al. | 364/767 |
| 4,320,464 | 3/1982 | Desmonds | 364/766 |
| 4,722,069 | 1/1988 | Ikeda | 364/767 |
| 4,724,529 | 2/1988 | Irukulla et al. | 364/761 |
| 4,754,422 | 6/1988 | Sakai et al. | 364/761 |

OTHER PUBLICATIONS

Lemaire et al., "*Improved Non-Restoring Division*", IBM Tech. Discl. Bull., vol. 23, No. 3, Aug. 1980, pp. 1149–1151.

Basu et al., "*On a Simple Postcorrection for Nonrestoring Division*", IEEE Trans. on Computers, Oct. 1975, pp. 1019–1020.

Sanyal, "An Algorithm for Nonrestoring Division", Computer Design, May 1977, pp. 124–125.

*Primary Examiner*—Gary V. Harkcom
*Assistant Examiner*—Tan V. Mai
*Attorney, Agent, or Firm*—Foley & Lardner, Schwartz, Jeffery, Schwaab, Mack, Blumenthal & Evans

[57] ABSTRACT

An integer division circuit performs a division operation on a dividend and a divisor each accomplished with sign information. The circuit includes a first latch circuit for temporarily storing, as sign control data, exclusive-OR operation data of the sign information of the dividend and divisor, an operation unit for forming a division operation on absolute value data of the dividend and divisor to produce a quotient, a correction circuit for correcting a sign of the quotient in response to the sign control data, and an overflow detection circuit for performing an exclusive-OR operation on the corrected-sign of the quotient and the sign control data to produce an overflow detection signal.

8 Claims, 3 Drawing Sheets

INTEGER DIVISION CIRCUIT PROVIDED WITH A OVERFLOW DETECTOR CIRCUIT

BACKGROUND OF THE INVENTION

The present invention relates to a data processing apparatus and, more particularly, to an integer division circuit employed in such an apparatus for performing a division operation on two integers each represented by a binary number and accompanied with a sign bit.

In a data form of N-bit length to be processed in a data processing apparatus, the most significant bit (MSB) of each data is a sign bit representing plus (+) or minus (−) and the remainding (N−1) bits represent a number thereof. Generally, the MSB of "0" represents plus (+) or a positive number, whereas the MSB of "1" represents minus (−) or a negative number. Moreover, the regative number is represented in a 2's complement form. In a division operation, the sign of the quotient data is determined by the exclusive OR operation of the sign bits of dividend and divisor data and the sign of a remainder is made coincident with the sign of the dividend.

Although various methods have been proposed and put into practical use for performing a division operation, a so-called non-restoring method is widely employed in a microprocessor or a microcomputer for a division operation. An integer division circuit explained in this specification as an example also employs the non-restoring method.

In the non-restoring method, a division operation is performed on positive numbers. To this end, the dividend and divisor are subjected at first, if they are negative, to an absolute operation to be converted into a positive number. Thereafter, the division operation on the dividend and divisor each converted into a positive number is performed by use of the non-restoring method to produce a quotient and a remainder. If either one of the dividend and divisor is negative, the sign data of the quotient is corrected as "1". That is, the operation for obtaining a 2's complement of the quotient is performed. Further, if the dividend is negative, the sign of the remainder is also corrected to produce a 2's complement thereof.

In such an integer division operation, an overflow occurs when the dividend is a negative maximum number and the divisor is "−1". For example, considering a data processing operation in an 8-bit length, when the dividend of "−$2^7$", which is a negative maximum number, is divided by a divisor of "−1", a quotient becomes "$2^7$". On the other hand, the range in numbers represented by an 8-bit length is "−$2^7$" to "$2^7-1$". Therefore, an overflow signal has to be produced in such a division operation.

According to the prior art, an overflow signal is produced by detecting that the dividend is a negative maximum number and the divisor is "−1" by use of a microprogram. For this reason, the execution speed of the division operation is lowered.

SUMMARY OF THE INVENTION

Therefore, an object of the present invention is to provide a division circuit having an overflow detection function and improved operation speed.

Another object of the present invention is to provide an integer division circuit which produces an overflow signal when a quotient is beyond a maximum number, without lowering its operation speed.

Still another object of the present invention is to provide a high speed integer division circuit having simplified construction.

A division circuit according to the present invention comprises a latch circuit for temporarily storing sign control data representative of exclusive-OR data of sign bits of a dividend and a divisor, a first register for temporarily storing an absolute value of the dividend, a second register for temporarily storing an absolute value of the divisor, an arithmetic operation unit for producing a quotient from the absolute values of the dividend and divisor and for correcting a sign of the quotient in response to the sign control data from the latch circuit, and an overflow detection circuit for performing an exclusive-OR operation of sign data of the corrected quotient and the sign control data from the latch circuit to produce an overflow detection signal.

When the dividend is a negative maximum number and the divisor is "−1", the sign control data takes logic "0", and the sign bit of the corrected quotient takes logic "1". Therefore, the overflow detection circuit produces the overflow detection signal of logic "1". On the other hand, when the dividend is not a negative maximum number and/or the divisor is not "−1", the sign control data is equal in logic value to the sign data of the corrected quotient, so that the overflow detection signal takes logic "0". Thus, the division circuit according to the present invention can detect the overflow without lowering operating speed and a complicated circuit construction.

BRIEF DESCRIPTION OF THE DRAWINGS

The above and other objects, advantages and features of the present invention will become more apparent from the following description taken in conjunction with the accompanying drawings, in which.

DETAILED DESCRIPTION OF THE EMBODIMENTS

Figure 1:
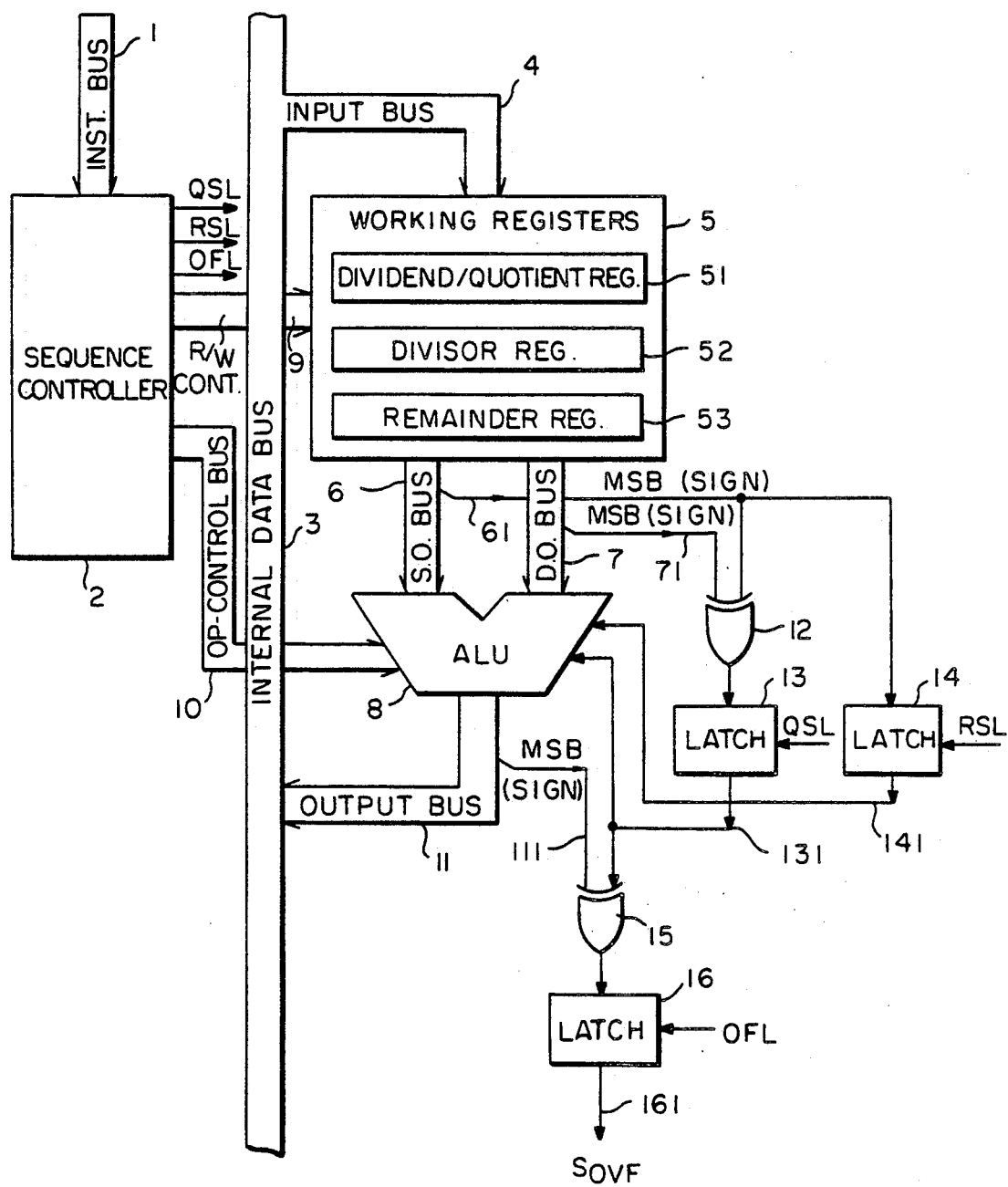
FIG. 1 is a block diagram representative of an embodiment of the present invention.

Referring to FIG. 1, there is shown an instruction execution unit according to an embodiment of the present invention. An instruction to be executed is supplied to a sequence controller 2 via an instruction bus 1. When a division instruction is supplied to the sequence controller 2, the controller 2 reads out dividend data and divisor data each consisting of N-bit from a memory or a general purpose register set (both not shown) and writes them into a dividend register 51 and a divisor register 52 in a working register set 5, respectively, by use of an internal data bus 3, an input bus 4 and a read-/write control bus 9. In an integer division operation employing the non-restoring method, the dividend register 51 also operates as a quotient register. The working register set 5 also includes a remainder register 53 for storing remainder data. In the non-restoring method, the division operation is performed on positive numbers. To this end, the sequence controller 2 reads the dividend data from the register 51 onto a source operand bus 6 and the divisor data from the register 52 onto a destination operand bus 7 by use of the read/write control bus 9. The MSB, i.e. the sign data, of the dividend data and the MSB, i.e. the sign data, of the divisor data are supplied via sign data lines 61 and 71 to an exclusive-OR (EX-OR) gate 12 whose output is in turn supplied to a latch circuit 13. The sign bit data of the dividend data is further supplied to a latch circuit 14. These latch circuits 13 and 14 latch the data supplied thereto in response to latch-enable signals QSL and RSL, respectively. The sequence controller 2 generates the latch-enable signals QSL and RSL simultaneously with each other and with reading the dividend and divisor data onto the buses 6 and 7. Accordingly, the latch circuit 13 latches, as a quotient sign control data, the EX-OR data of the sign data of the dividend and divisor data, and the latch circuit 14 latches, as a remainder sign control data, the sign data of the dividend data. When either one of the dividend and divisor is negative, the quotient sign control data 131 from the latch circuit 13 takes logic "1". On the other hand, in case where both of the dividend and divisor are positive or negative, the control data 131 takes logic "0". The remainder sign control data 141 from the latch circuit 14 takes logic "0" when the dividend is positive and logic "1" when the dividend is negative.

The source and destination operand buses 6 and 7 are connected respectively to first and second sets of input terminals of an arithmetic and logic unit (ALU) 8. The ALU 8 performs a monodic operation or a dyadic operation on the operand data supplied thereto under the control of an operation control code supplied from the sequence controller 2 via an operation control bus 10. In order to obtain an absolute value of each of the dividend and divisor data, the sequence controller 2 designates a monodic operation and a 2's complement operation to the ALU 8.

Figure 2:
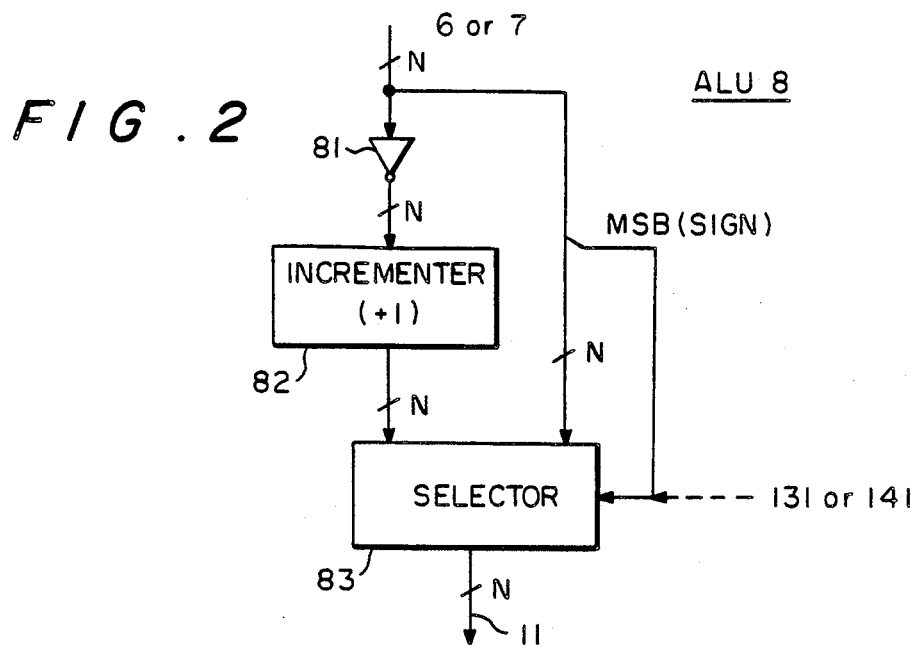
FIG. 2 is a block diagram representative of an equivalent circuit of an arithmetic and logic unit (ALU) shown in FIG. 1 in a case of performing a 2's complementary operation.

Referring to FIG. 2, when the ALU 8 is designated to the 2's complement operation, it is equivalently constituted of an inverter 81, an incrementer 82 and a selector 82. The inverter 81 inverts the operand data supplied thereto, and the incrementer 82 increments the inverted data by one. As a result, the 2's complementar of the supplied operand data is derived from the incrementer 82, and is supplied to a first set of input terminals of the selector 83 having a second set of input terminals supplied the operand data as it is. The MSB, i.e. sign data, of the operand data is used for controlling the selector 82 as shown. When the sign data is logic "1", the selector 83 selects the output of the incrementer 82, to output 2's complement of the operand data. On the other hand, in case of logic "0" of the sign data, the selector 83 selects the operand data. Thus, each of the dividend and divisor data is converted, if it is negative, into an absolute value by the ALU 8, and the dividend and divisor data thus converted into an absolute value are restored into the dividend and divisor registers 51 and 52, respectively, via an output bus 11, the internal data bus 3 and the input bus 4.

Since both of the dividend and divisor data are restored respectively into the registers 51 and 52 in an absolute value, the sequence controller 2 commands the working register set 5 and the ALU 8 to perform a division operation employing the non-restoring method, by use of the control buses 9 and 10.

Figure 3:
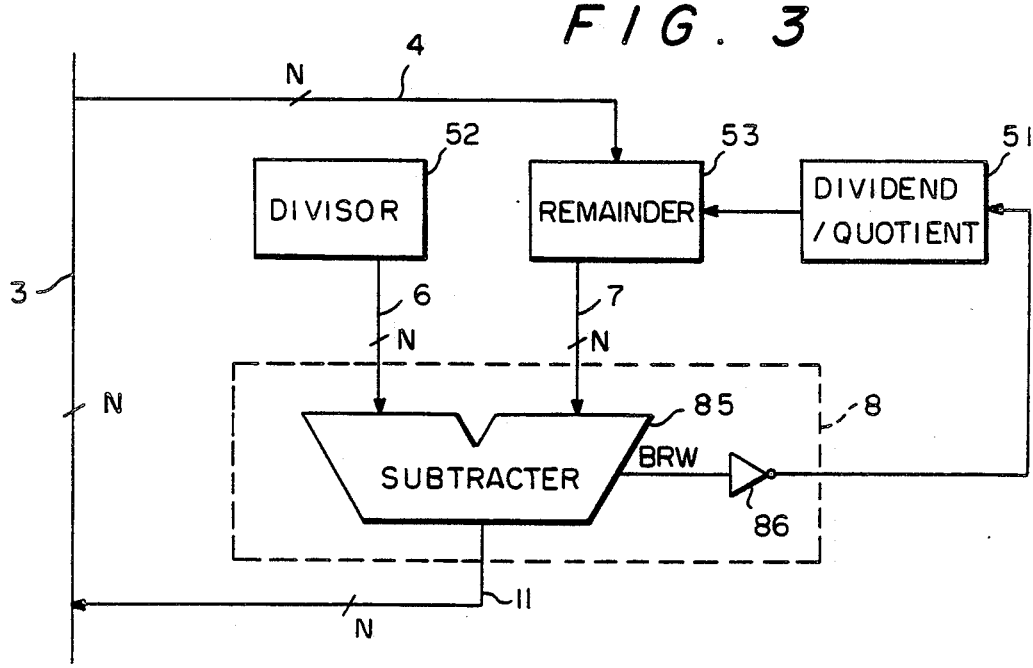
FIG. 3 is a block diagram representative of an equivalent circuit of ALU and working registers shown in FIG. 1 in a case of a division operation by a nonrestoring method.

Referring to FIG. 3, there is shown an equivalent circuit in the division operation employing the non-restoring method. The ALU 8 is constituted of a subtracter 85 and an inverter 86 inverting a borrow signal BRW from the subtracter 85. Each of the registers 51 and 53 has a data shift operation. The data from the divisor and remainder registers 52 and 53 are supplied to the subtracter 85 which subtracts the divisor of the register 52 from the data of the register 53. If the data of the register 53 is smaller than the divisor of the regisger 52, the borrow signal BRW is generated and the inverted signal thereof is supplied to the quotient register 51 to set logic "0" into the least significant bit (LSB) of the register 51. In response thereto, the content of the register 51 is shifted by one in the MSB direction, and the shifted one bit from the register 51 is supplied to the register 53. When the content of the register 53 is equal to or larger than the divisor of the register 52, the subtraction resultant data is stored into the register 53 via the buses 11, 3 and 4. At this time, the borrow signal BRW is not generated, and hence logic "1" is set in the LSB of the register 51 by the inverter. The above operation is repeated N times, since the each of the dividend and divisor data is N-bit length. Thus, the register 51 stores a quotient and the register 53 stores a remainder.

Since the division operation is performed on the absolute values of the dividend and divisor data, the signs of the quotient and remainder are required to be corrected. For this purpose, the sequence controller 2 reads the quotient data from the register 51 onto the bus 6 by use of the read/write control bus 9 and designates the 2's complement operation to the ALU 8 by use of the control bus 10. Since the 2's complement operation is designated, the equivalent circuit of the ALU 8 is represented as shown in FIG. 2. In this case, however, the quotient sign control signal 131 from the latch circuit 13 is employed as the control signal to the selector 83 as shown by a dotted line in FIG. 2. When the control signal 131 is logic "1", the selector 83 selects the output of the incrementer 82, i.e. 2's complement of the quotient data. On the other hand, in the case of logic "0" of the signal 131, the selector 83 selects the quotient data as it is. In this correcting operation of the quotient data, the sequence controller further generates a third latch-enable signal OFL which is in turn supplied to a latch circuit 16. This circuit 16 receives the output of an EX-OR gate 15 which is supplied with the quotient sign control signal 131 and the sign data of the corrected quotient via a sign data line 111. The EX-OR gate 15 produces logic "1" at the output thereof when the logic values of the signals 131 and 111 are not equal to each other, and the logic "1" output of the EX-OR gate 15 is latched in the latch circuit 16 in response to the latch-enable signal OFL. An overflow signal $S_{OVF}$ is thereby generated at a signal line 161. Assume now that the bit length of each of the dividend and divisor data is 8 and the dividend is a negative maximum number, i.e. "$-2^7$". Assume also that the divisor is "$-1$". The quotient sign control signal 131 thereby takes logic "0". The quotient becomes "$2^7$", i.e. "1000 0000". Therefore, the EX-OR gate 15 produces the logic "1" and the overflow signal $S_{OVF}$ is generated by the latch circuit 16. When the dividend is not a negative maximum number and/or the divisor is not "$-1$", the latch circuit 16 produces the logic "0" signal. That is, the overflow signal $S_{OVF}$ is not generated. Thus, the occurrence of an overflow, i.e. the generation of the overflow signal $S_{OVF}$, is detected simultaneously with the quotient correcting operation. The operating speed is thereby not lowered. The corrected quotient data is restored into the register 51 via the buses 11, 3 and 4.

In order to correct the sign of the remainder, the sequence controller supplies the remainder data from the register 53 onto the bus 6. The 2's complement operation is designated to the ALU 8. The remainder sign control signal 141 from the latch circuit 14 is employed as the control signal to the selector 83 as shown by a dotted line in FIG. 2. The remainder data thus corrected is restored into the register 53.

Figure 4:
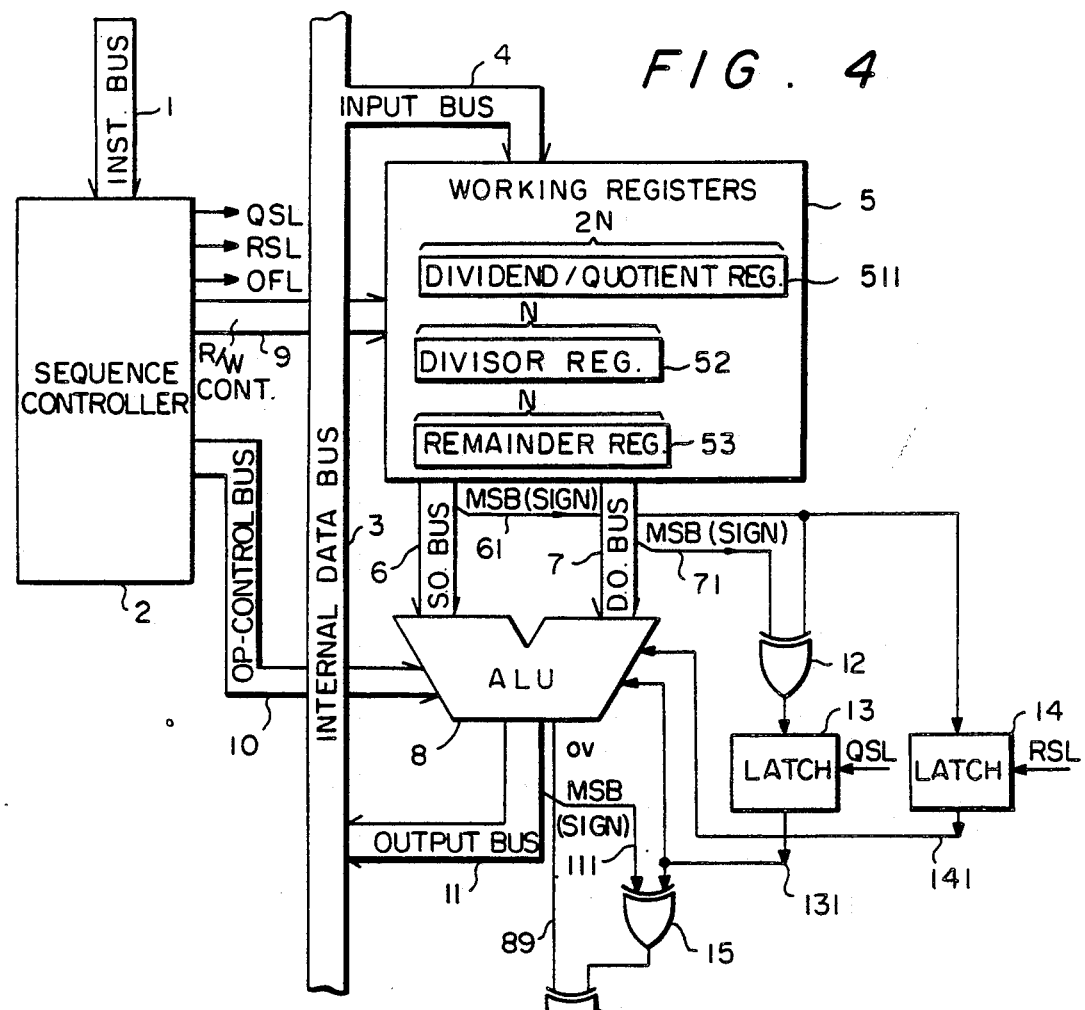
FIG. 4 is a block diagram representative of another embodiment of the present invention.

Referring to FIG. 4, there is shown another embodiment of the present invention, wherein the same constituents as those shown in FIG. 1 are denoted by the same reference numerals to omit the further description thereof. In the present embodiment, dividend data of 2N-bit length is integer-divided by divisor data of N-bit length and quotient data of N-bit is derived. A dividend-/quotient register 511 thereby has a 2N-bit length. Since each of the internal data bus 3 and input bus 4 is N-bit width, the sequence controller 2 writes the more significant N bits data of the dividend into the more significant N bits of the register 511 and thereafter writes the less significant N bits data of the dividend into the less significant N bits of the register 511. The divisor data of N-bit is written into the register 52. Each of the buses 6, 7 and 11 is also N-bit width and the ALU 8 performed a predetermined operation on the N-bit data. In order to obtain the absolute value of each of the dividend and divisor data, the sequence controller 2 reads out the more significant N bits data of the dividend from the register 511 onto the bus 6 and the divisor data from the register 52 onto the bus 7. At the same time, the controller 2 generates the latch-enable signals QSL and RSL. Therefore, the EX-OR data of the signs of the dividend and divisor is latched into the latch circuit 13 and the sign of the dividend is latched into the latch circuit 14. Differently from the embodiment shown in FIG. 1, the sequence controller 2 of this embodiment commands at first the ALU 8 to perform the 2's complement operation on the divisor data from the bus 7. The divisor data is thereby restored into the register 52 in the absolute value form via the buses 11, 3 and 4. Thereafter, the sequence controller 2 reads out the less significant N-bits data of the dividend from the register 511 onto the bus 7 and commands the ALU 8 to perform 2's complement operation thereon by use of the control bus 10. In this case, the control signal 141 is employed to control the selector 83 (FIG. 2). Moreover, if a carry signal is produced by the incrementer 82, this carry signal is temporarily held in the ALU 8. The less significant N bits data of the dividend is thereby restored into the less significant N bits of the register 511 in the absolute value form. Subsequently, the controller 2 commands the ALU 8 to perform 2's complement operation on the more significant N bits data of the dividend from the bus 6 also in this case, the control signal 14 is employed to control selector 83. Moreover, the incrementer 82 increments the output of the inverter 84 only when the carry signal responsive to the previous increment step has been produced and held. The more significant N bits data of the dividend is thereby restored into the more significant N bits of the register 511. Thus, each of the dividend and divisor is converted into an absolute value or positive value and restored into the registers 511 and 52, respectively.

Figure 5:
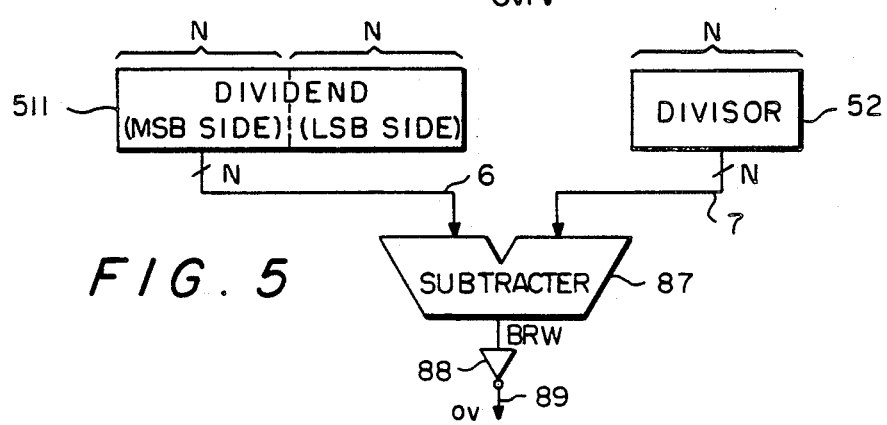
FIG. 5 is a block diagram representative of an equivalent circuit of ALU shown in FIG. 4 in a case of a data comparison operation.

In an integer division operation on the dividend of 2N-bit and the divisor of N-bit, the overflow signal $S_{OVF}$ has to be produced in two cases. The first case is that the quotient data cannot be represented by N-bit length, and the second case is that the quotient data can be represented by N-bit length but the MSB thereof is logic "1" in spite of logic "0" of the control signal 131. The first case can be detected by comparing in the absolute value the more significant N bits data of the dividend with the divisor. That is, when the more significant N bits data of the dividend is equal to or larger than the divisor, the overflow occurs. To this end, the sequence controller 2 reads out the more significant N bits data of the dividend from the register 511 onto the bus 6 and the divisor data from the register 52 onto the bus 7. The controller 2 further commands the ALU 8 to performs a data comparison operation on two data applied thereto by use of the operation control bus 10. As this time, the ALU 8 operates a subtracter 88, as shown in FIG. 5, to subtract the divisor data from the more significant N bits data of the dividend. When the divisor data is larger than the more significant N bits data of the dividend, a borrow signal BRW is produced from the subtracter 87. On the other hand, in case where the divisor data is equal to or smaller than the more significant N bits of the dividend, i.e. the latter is equal to or larger than the former, the borrow signal BRW is not generated to take logic "0". This logic "0" level is inverted by an inverter 88 to produce a logic "1" signal OV. The sequence controller 2 further generates the latch-enable signal OFL in this step. In response the signal OFL, the latch circuit 16 latches the signal OV of logic "0" or "1" supplied thereto via a line 89 and an OR gate 20. Therefore, when the more significant N bits data of the dividend is equal to or larger than the divisor, the overflow signal $S_{OVF}$ is generated. The execution unit shown in FIG. 4 suspends the division operation and inform the occurrence of the overflow.

When the overflow signal $S_{OVF}$ is not generated, the sequence controller 2 commands the working register set 5 and ALU 8 to perform the division operation by use of the control buses 9 and 10, as mentioned above with reference to FIG. 3. As a result, quotient data and remainder data are obtained and stored into the registers 511 and 53, respectively. In order to correct the sign of the quotient and detect the above second case of the overflow occurrence, the less significant N bits data of the quotient is transferred onto the bus 6 from the register 511 and the quotient sign control signal 131 from the latch circuit is employed to control the selector 83 (FIG. 2). If the control signal 131 is logic "0" and the most significant bit of the less significant N bits data of the quotient, i.e. the sign bit of the quotient, is logic "1", the EX-OR gate 15 produce logic "1" at the output thereof. The sequence controller 2 produce again the latch-enable signal OFL in this step. As a result, the overflow signal $S_{OVF}$ is generated to inform the occurrence of the overflow. On the other hand, in case where the control signal 131 and the sign bit of the quotient are logic "0" and logic "0", or logic "1" and logic "0", or logic "1" and logic "1", respectively, the sign-corrected quotient, i.e. the 2's complement of the raw quotient, is derived from the ALU 8 and restored into the register 511. The sign correction operation is also preformed on the remainder stored in the register 53 by use of the remainder sign control signal 141. Thus, the division circuit according to the present invention also produces the overflow signal $S_{OVF}$ without lowering the operating speed and without a complicated circuit construction.

It is apparent that the present invention is not limited to the above embodiments, but may be modified and changed without departing from the scope and spirit of the invention.

What is claimed is:

1. A division circuit for performing a division operation on dividend and divisor data each accompanied with sign information comprising:
    first storage means for temporarily storing sign control data which takes a first logic value when both of said sign information of said dividend and divisor data are equal to each other and takes a second logic value when said sign information of said dividend data is different from said sign information of said divisor data,
    second storage means for temporarily storing said dividend data in an absolute value form,
    third storage means for temporarily storing said divisor data in an absolute value form,
    means for performing a division operation on said data stored in said second and third storage means to produce quotient data,
    means responsive to said sign control data stored in said first storage means for performing a sign correction operation on said quotient data to produce sign-corrected quotient data accompanied with corrected sign information, and
    means for generating an overflow signal when said sign control data takes a first logic value and said corrected sign information represents a negative sign.

2. The circuit as claimed in claim 1, wherein said overflow signal generating means includes an exclusive-OR gate supplied with said sign control data and said corrected sign information of said sign-corrected quotient data.

3. The circuit as claimed in claim 2, wherein said overflow signal generating means further includes a latch circuit latching an output said exclusive-OR gate when said quotient data is subjected to a sign correction operation.

4. The circuit as claimed in claim 2, wherein said first storage means includes an additional exclusive-OR gate supplied with said sign information of said dividend and divisor data.

5. A division circuit comprising:
    first and second registers, first means for storing dividend data and divisor data in said first and second registers, respectively, each of said dividend and divisor data being accompanied with sign information,
    second means for performing an exclusive-OR operation on said sign information of said dividend and divisor data and for temporarily storing operation resultant data, said operation resultant data taking a first logic level when both of said sign information of said dividend and divisor data are equal to each other and taking a second logic level when said sign information of said dividend data is different from said sign information of said divisor data third means for converting said dividend data into absolute value data and for restoring converted dividend data in said first register,
    fourth means for converting said divisor data into absolute value data and for restoring converted divisor data in said second register,
    fifth means responsive to said converted dividend data and said converted divisor data for performing a division operation to produce quotient data,
    sixth means responsive to said operation resultant data stored in said second means for performing a sign correction operation on said quotient data to produce sign-corrected quotient data accompanied with corrected sign information, and
    a gate circuit supplied with said operation resultant data stored in said second means and said corrected sign information of said sign-corrected quotient for producing an overflow signal when said operation resultant data takes said first logic level and said corrected sign information represents a negative sign.

6. The circuit as claimed in claim 5, wherein said third means converts said dividend data into a 2's complement when said sign information thereof represents a negative sign, said fourth means converting said divisor data into a 2's complement when said sign information thereof represents a negative sign, and said sixth means converts said quotient data into 2's complement when said operation resultant data takes said second logic level.

7. A division circuit for performing a division operation on dividend and divisor data, said dividend data having a bit length longer than a bit length of said divisor data and each of said dividend and divisor data being accompanied with sign information, said circuit comprising:
    means for performing an exclusive-OR operation on said sign information of said dividend and divisor data to produce sign control data, said sign control data taking a first logic level when both of said sign information of said dividend and divisor data are equal to each other and taking a second logic level when said sign information of said dividend data is different from said sign information of said divisor data,
    first storage means for temporarily storing said dividend data in an absolute value form,
    second storage means for temporarily storing said divisor data in an absolute value form,
    means for producing a first overflow signal when more significant bits data stored in said first storage means is equal to or larger than data stored in said second storage means,
    means for performing a division operation on data stored in said first and second storage means to produce quotient data accompanied with sign information,
    means responsive to said sign control data for performing a sign correction operation on said quotient data to produce sign-corrected quotient data accompanied with corrected sign information, and
    a gate circuit supplied with said sign control data and said corrected sign information for producing a second overflow signal when said sign control data takes said first logic level and said corrected signal information represents a negative sign.

8. The circuit as claimed in claim 7, wherein said gate circuit comprises an exclusive-OR gate.

* * * * *